United States Patent [19]

Sugimoto et al.

[11] Patent Number: 4,884,015
[45] Date of Patent: Nov. 28, 1989

[54] PROBING CONTROL METHOD AND APPARATUS FOR MECHANISM WITH MULTIPLE DEGREES OF FREEDOM

[75] Inventors: Koichi Sugimoto, Hiratsuka; Hisaaki Hirabayashi; Tomoyuki Masui, both of Yokohama, all of Japan

[73] Assignee: Hitachi, Ltd., Tokyo, Japan

[21] Appl. No.: 875,189

[22] Filed: Jun. 17, 1986

[30] Foreign Application Priority Data

Jun. 17, 1985 [JP] Japan .................................. 60-129806
Sep. 30, 1985 [JP] Japan .................................. 60-215014

[51] Int. Cl.⁴ .............................................. G05B 1/06
[52] U.S. Cl. ..................................... 318/640; 356/400; 350/96.20
[58] Field of Search ................... 364/167; 350/96.20; 318/480, 313, 640, 638, 560–566; 356/399–401

[56] References Cited

U.S. PATENT DOCUMENTS

| | | | |
|---|---|---|---|
| 3,808,485 | 4/1974 | Sakai et al. | 318/480 |
| 4,191,916 | 3/1980 | Zasio et al. | 318/640 |
| 4,500,165 | 2/1985 | Scholl et al. | 350/96.20 |
| 4,514,674 | 4/1985 | Hollis, Jr. et al. | 318/640 |
| 4,664,524 | 12/1987 | Hattori et al. | 356/401 |
| 4,707,067 | 11/1987 | Haberland et al. | 350/96.20 |

FOREIGN PATENT DOCUMENTS 1066426 11/1979 Canada .
1198797 12/1985 Canada .

Primary Examiner—William M. Shoop, Jr.
Assistant Examiner—David Martin
Attorney, Agent, or Firm—Fay, Sharpe, Beall, Fagan, Minnich & McKee

[57] ABSTRACT

A probing control apparatus for use in aligning an object comprises: a mechanism having n-degrees of freedom and adapted for controlling the object; n pieces of actuators for actuating the mechanism; detecting means for detecting change in the output from the object in response to the operation of each actuator; and control means for computing a command for each actuator in accordance with a change in the output detected by the detecting means and amount of movement of the mechanism, and for controlling each actuator in accordance with the command such that the output from the object takes the maximum value.

11 Claims, 5 Drawing Sheets (a)

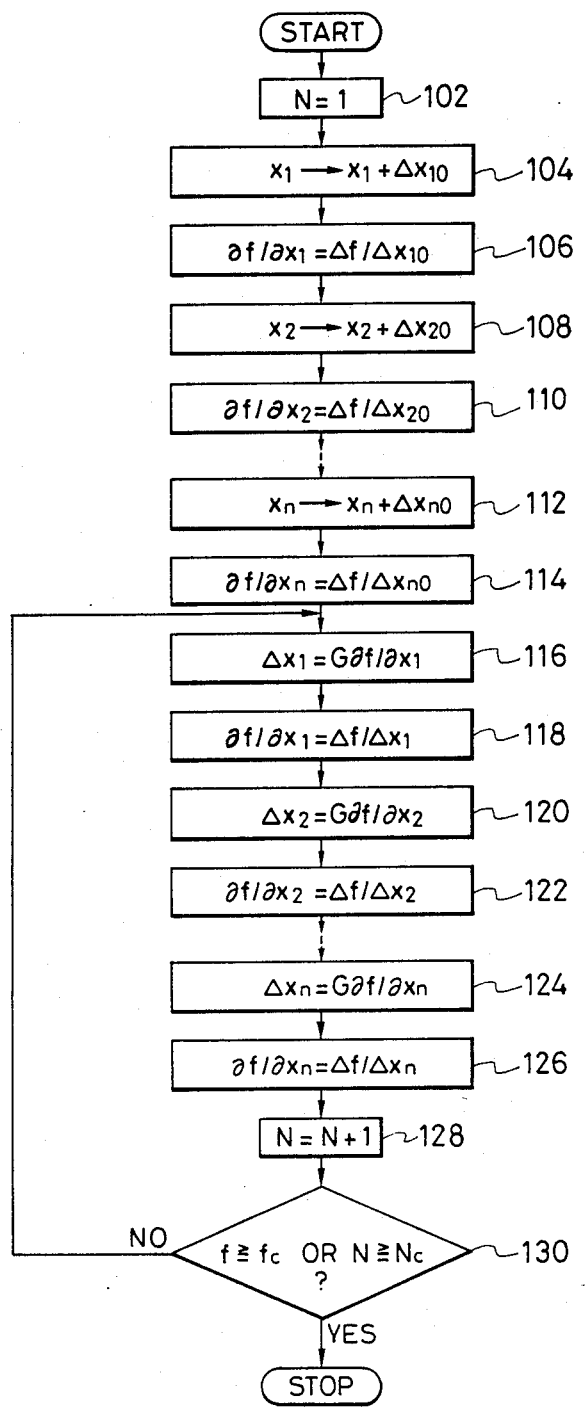

PROBING CONTROL METHOD AND APPARATUS FOR MECHANISM WITH MULTIPLE DEGREES OF FREEDOM

BACKGROUND OF THE INVENTION

1. Field of the Invention

The present invention relates to a controlling method and apparatus for a mechanism with multiple degrees of freedom which is used in an automatic adjustment operation. More particularly, the invention is concerned with a probing control method and apparatus suitable for driving an object in such a manner that an estimation function determined from the output of the object takes the maximum value. Still more particularly, the invention is concerned with an adjusting method and apparatus suitable for use in attaining alignment of optical axes in laser diodes with optical fibers.

2. Description of the Prior Art

A laser diode with optical fiber, particularly the lens characteristics thereof, is shown in IEEE JOURNAL OF QUANTUM ELECTRONICS, VOL. QE-16, No. 10, OCTOBER 1986, pp 1059–1066, "Design of a Miniature Lens for Semiconductor Laser to Single-Mode Fiber Coupling".

In the known device of the kind described, the optical axis alignment is attained by moving the optical fiber uniaxially, i.e., with one-degree of freedom, and fixing the optical fiber at a point where the output from the fiber is maximized. With the movement of the optical fiber in one-degree of freedom, however, it is not possible to attain the true maximum output point due to, for example, lack of precision of parts, with a result that the optical axis alignment cannot be conducted with sufficiently high precision.

SUMMARY OF THE INVENTION

Accordingly, an object of the invention is to provide a probing control method which incorporates a mechanism with multiple degrees of freedom so as to move an object such as an optical fiber three-dimensionally, thereby to find out the point where the level of the output from the object is maximized.

Another object of the invention is to provide a method of controlling an automatic aligning device for optical axis alignment of a laser diode with optical fiber, capable of attaining the optical axis alignment of the fiber through detection of a point where the optical output value from the fiber is maximized.

Still another object of the invention is to provide a probing control method which is capable of diminishing the probing time and the load applied to the mechanism.

To this end, according to the invention, there is provided a method of driving, in one-by-one fashion and in accordance with a predetermined sequence, n pieces of actuators for actuating a mechanism with n-degrees of freedom, the method comprising detecting the amount of change in the output from a control object in response to the operation of said actuators, forming a command for each actuator from driving data containing the amount of movement of said actuator in the preceding operation and the amount of change in the output from the control object, and driving each actuator in accordance with the thus formed command.

BRIEF DESCRIPTION OF THE DRAWINGS

FIG. 6 is a flow chart illustrating the controlling procedure in accordance with a first embodiment of the probing control method in accordance with the invention.

DESCRIPTION OF THE PREFERRED EMBODIMENTS

Figure 1:
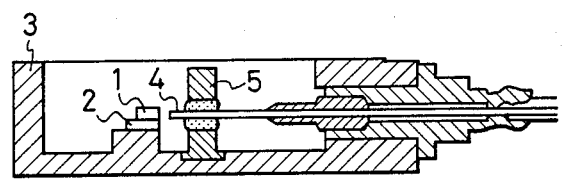
FIG. 1 is a sectional view of a laser diode with an optical fiber.
Figure 2:
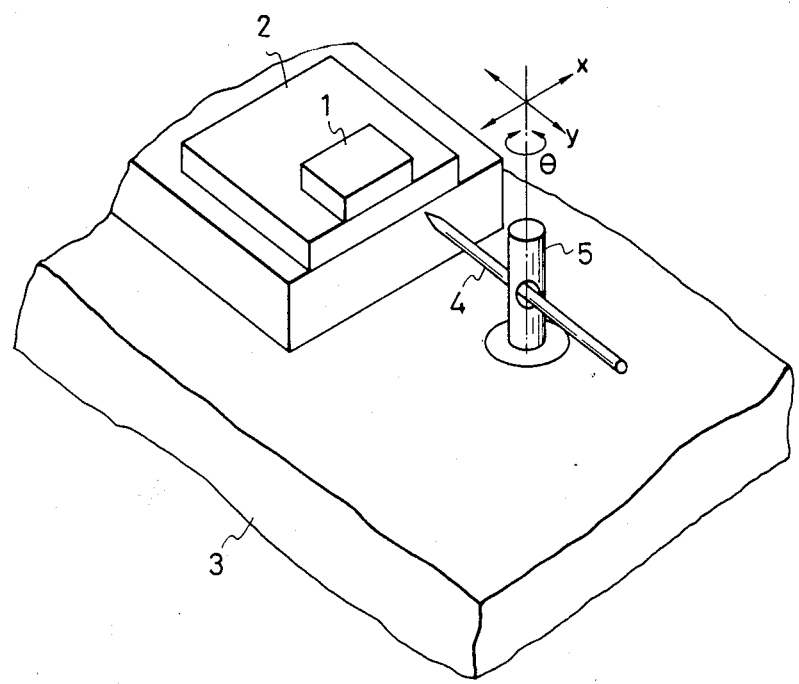
FIG. 2 is an illustration of the construction of a supporting column shown in FIG. 1.

FIG. 1 shows an example of the construction of a laser diode. A reference numeral 1 denotes a laser diode chip fixed to a sub-mount 2 which is in turn secured to a frame 3. On the other hand, an optical fiber 4 passes through a hole formed in the central portion of a supporting post 5 which is fixed at its one end to frame 3. The output end is led to the outside through a hole formed in the frame 3. The position of the light-emitting portion of the laser diode chip 1 fluctuates with respect to the frame 3, due to insufficient precision of machining of the chip and insufficient precision of mounting the chip on the sub-mount. Similarly, the position of the end of the optical fiber fluctuates. In order to obtain a predetermined output from the laser diode, it is necessary that the optical axes of the laser diode chip 1 and the optical fiber 4 are aligned with a precision in the order of 0.1 $\mu$m to 1 $\mu$m. To this end, hitherto, the alignment has been attained by grasping one end of the supporting post 5, moving the supporting post 5 in the X and Y directions or X, Y and $\theta$ directions, thereby moving the end of the optical fiber 4 while plastically deforming the supporting post 5. During this operation, the output from the optical fiber 4 is observed to probe the position where the output value exceeds a predetermined level, thereby attaining optical axis alignment between the optical fiber 4 and the laser diode chip 1. In order to attain automation of this operation, it is necessary to grasp the end of the supporting post 5 by a mechanism having multiple degrees of freedom and to control the mechanism in accordance with the output from the laser diode, thereby effecting plastic deformation of the supporting post.

Figure 3:
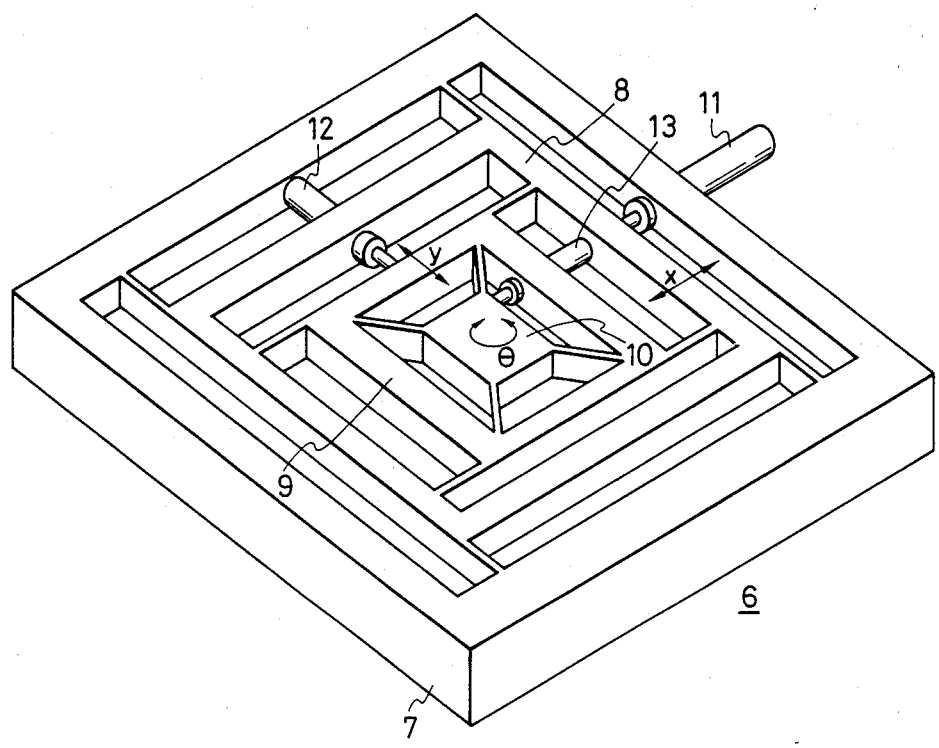
FIG. 3 is an illustration of a fine adjustment mechanism employed in the method of the invention.

FIG. 3 shows a mechanism having three degrees of freedom, as an example of the mechanism with multiple degrees of freedom. This mechanism 6 has a fine adjustment device composed of an outer frame 7, intermediate frame 8, inner frame 9 and an end frame 10. The outer frame 7 and the intermediate frame 8 are coupled to each other through a parallel leaf spring mechanism. Similarly, the intermediate frame 8 and the inner frame 9 are coupled to each other through a similar parallel leaf spring mechanism. The outer frame 7 and the intermediate frame 8; and the inner frame 8 and the intermediate frame 9 are adapted to be displaced in X and Y directions by piezoelectric actuators 11 and 12, in proportion to the voltage applied to piezoelectric actuators. The inner frame 9 and the end frame 10 are coupled through a spring mechanism which is constructed in such a manner as to cross at the central points, and are adapted to be actuated by a piezoelectric actuator 13, thereby effecting minute angular movement about the central point (in the $\theta$ direction) proportional to the voltage applied to the piezoelectric actuator. A supporting post gripper is fixed to the lower side (not shown) of the end frame 10. The gripper can grip the supporting post 5 so as to deflect the latter in three directions, i.e., X, Y and $\theta$ directions. The outer frame 7 is fixed to a stationary member.

Figure 4:
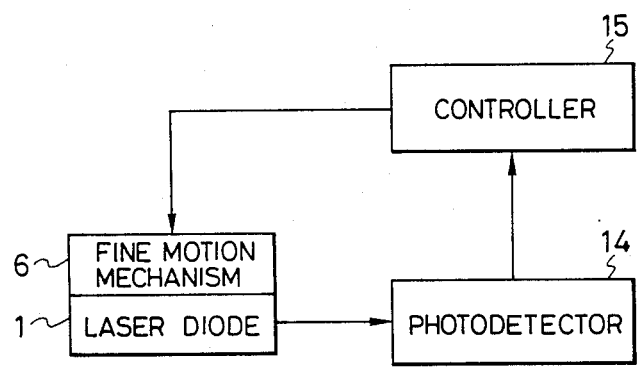
FIG. 4 is a block diagram of the whole construction of an optical axis aligning apparatus to which the invention is applied.

FIG. 4 shows the arrangement of the whole portion of the invention. The output from the laser diode 1 is detected by a detector 14 and is sent to a controller 15. The controller 15 computes the amounts of driving of three piezoelectric actuators in accordance with the following method, and applies to each piezoelectric actuator a voltage corresponding to the computed value.

A description will be made hereinunder as to the control sequence in the first embodiment of the invention.

It is assumed here that the position of the gripper when it has just gripped the supporting post 5 is expressed by $x_0$, $y_0$ and $\theta_0$, while the output of the laser diode in this state is represented by $f_0$. When the factors x, y and $\theta$ have initial values $x_0$, $y_0$ and $\theta_0$, the amounts of initial displacement $\Delta x_1$, $\Delta y_1$ and $\Delta\theta_1$ are determined. Symbols $\Delta x$, $\Delta y$ and $\Delta\theta$ represent the displacements in x, y and $\theta$ directions, while suffix n represents the n-th cycles of movement.

The optical output f detected by the detector 14 through the fiber is determined by x, y and $\theta$.

As the first step, a movement by amount $\Delta x_1$ is caused and the gradient of the optical power distribution surface is determined by the difference in the optical output between the state before the movement and the state after the movement.

$$\left(\frac{\partial f}{\partial x}\right)_1 = \frac{f_{x1} - f_0}{\Delta x_1} \tag{1}$$

where, $f_0$ and $f_{x1}$ represent the value of the optical output in the states before and after the movement by the amount $\Delta x_1$.

Then, a movement by the amount $\Delta y_1$ is effected to provide the following condition.

$$\left(\frac{\partial f}{\partial y}\right)_1 = \frac{f_{y1} - f_{x1}}{\Delta y_1} \tag{2}$$

where, $f_{x1}$ and $f_{y1}$ represent the optical output values obtained in the states before and after the movement by the amount $\Delta y_1$ and can be determined by measurement. Then a movement by the amount $\Delta\theta_1$ is conducted so that the following condition is obtained.

$$\left(\frac{\partial f}{\partial \theta}\right)_1 = \frac{f_{\theta 1} - f_{y1}}{\Delta\theta_1} \tag{3}$$

After the completion of movements by amounts x, y and $\theta$, the gradient s of the optical power distribution surface and the height h are determined as follows.

$$s_1 = \sqrt{\left(\frac{\partial f}{\partial x}\right)_1^2 + \left(\frac{\partial f}{\partial y}\right)_1^2 + \left(\frac{\partial f}{\partial \theta}\right)_1^2} \tag{4}$$

$$h_1 = f_{\theta 1} \tag{5}$$

Using the conditions of the formulae (1) to (5), the amounts $\Delta x_2$, $\Delta y_2$ and $\Delta\theta_2$ of the second cycle of operation in the x, y and $\theta$ directions are determined as follows.

$$\Delta x_2 = G\left(\frac{\partial f}{\partial x}\right)_1 \tag{6}$$

$$\Delta y_2 = G\left(\frac{\partial f}{\partial y}\right)_1 \tag{7}$$

$$\Delta\theta_2 = G\left(\frac{\partial f}{\partial \theta}\right)_1 \tag{8}$$

where, $$G = A\, s_1^j / h_1^k \tag{9}$$

A, B, j and k are constants the optimum values of which are obtainable through experiments. If the constant A is positive, the movement is caused in such a direction as to reduce s, whereas, when the constant A is negative, the movement is caused in such a direction as to decrease the value s. It is to be noted also that the amount of movement is decreased as the value h is increased.

Similarly, the amounts $\Delta x_n$, $\Delta y_n$ and $\Delta\theta_n$ in the x, y and $\theta$ directions in the n-h cycles of movement are determined as follows.

$$\Delta x_n = G\left(\frac{\partial f}{\partial x}\right)_{n-1} \tag{10}$$

$$\Delta y_n = G\left(\frac{\partial f}{\partial y}\right)_{n-1} \tag{11}$$

$$\Delta\theta_n = G\left(\frac{\partial f}{\partial \theta}\right)_{n-1} \tag{12}$$

where, $$G = A\, s_{n-1}^j / h_{n-1}^k \tag{13}$$

while $$s_{n-1} = \sqrt{\left(\frac{\partial f}{\partial x}\right)_{n-1}^2 + \left(\frac{\partial f}{\partial y}\right)_{n-1}^2 + \left(\frac{\partial f}{\partial \theta}\right)_{n-1}^2} \tag{14}$$

$$h_{n-1} = f_{\theta, n-1} \tag{15}$$

The cycles of movement are further repeated until the number n exceeds a predetermined value or the value s comes down below a predetermined value or the value h exceeds a predetermined value.

Various methods for determining G(=f(s,h)) employing s and h are usable in place of the formula (9).

Figure 5:
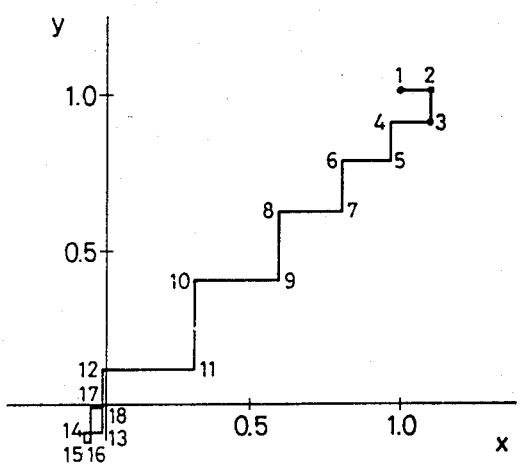
FIGS. 5a and 5b are charts showing the result of the control.
Figure 5B:
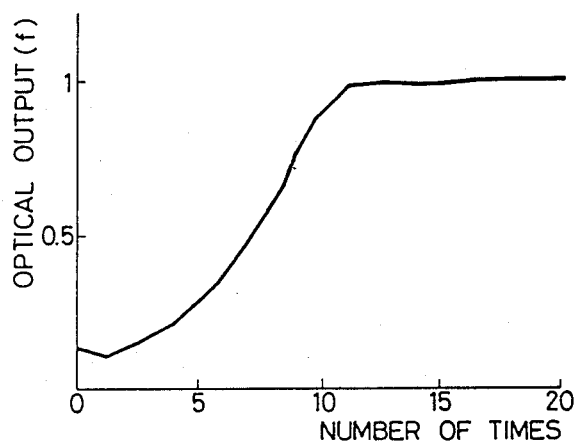

FIG. 5 shows the flow of the control method described above. More specifically, FIG. 5a shows the result of application of the control method of the invention to a mechanism having two degrees of freedom in which the output f is given as a function of x and y, i.e., as $f = e^{-(x^2+y^2)}$ with the angle $\theta$ omitted. Numerals appearing in the Figure represents the number of cycles. It will be seen that the output f takes the maximum value of 1 on condition of $x=0$ and $y=0$. In this embodiment, conditions of $A=0.5$, $m=0$, $x_0=y_0=1$, $\Delta x_1=0.1$ and $\Delta y_1=-0.1$ are met. As will be clearly seen from these conditions, the gripper has been brought to the position where the output f takes the maximum value. The output value obtained in this state is shown in FIG. 5b.

In the described embodiment, the movement in respective steps for the purpose of the probing is intended not only for the approach to the designated maximum value but also for the measurement of the gradient in the vicinity of the maximum value point. As a result, an efficient probing is executed because the probing and the measurement of gradient are conducted at one time.

In the severest method, the movement by the amount $\Delta_x$ in the x-axis direction is followed by the movement in the $-\Delta_x$ direction, and a subsequent movement $\Delta_y$ in the y-axis direction is followed by a movement $-\Delta_y$, and finally a movement is effected in the steepest direction on the x, y plane. The method of the invention is superior to the above-explained severest method in that (1) the number of the moving cycles is smaller, and that (2) number of sharp turns (movement $-\Delta_x$ following the movement $\Delta_x$ means 180° change in the moving direction) is smaller.

A description will be made hereinunder as to the case where the control sequence explained above is applied to displacement of n-th order $(x_1, \ldots, x_n)$, with specific reference to FIG. 6.

The distances $(\Delta x_{10}, \Delta x_{20}, \ldots, \Delta x_{n0})$ for the first cycle of movement are beforehand determined, as well as the level of the optical output $(f_c)$ at which the probing is completed and the number Nc of the cycles at which the probing is to be stopped. In Step 104, a movement $\Delta x_{10}$ is caused in the direction $x_1$. The amount of change in the optical output is expressed by $\Delta f$. The gradient of the optical power distribution surface shown by the far field pattern in the direction $x_1$ is expressed as $\Delta f/\Delta x_{10}$ (Step 106). Then, in Step 108, a movement $\Delta x_{20}$ is effected in the direction $x_2$ from the instant point. In a strict sense, it is necessary that a backward driving is effected to return the object to the initial position, i.e, to the position taken before the movement $\Delta x_{10}$. Such a backward movement, however, is omitted in view of the fact that the movement $\Delta x_{10}$ is negligibly small and in order to shorten the probing time. The inclination during this movement is expressed by $\Delta f/\Delta x_{20}$ (Step 110). Thereafter, the movements $\Delta x_{30}$, $\Delta x_{40}, \ldots, \Delta x_{no}$ are consecutively conducted (Step 112) and inclinations are computed (Step 114). Thereafter, a movement $\Delta x_1$ is effected in the direction $x_1$. The $\Delta x_1$ is determined in accordance with the formula $\Delta x_1 = G\sigma f/\sigma x_1$. The value of inclination calculated immediately after the previous movement in the direction $x_1$ ($\Delta f/\Delta x_1$, $\Delta f/\Delta x_{10}$ for the first movement) is used as $\Delta f/\Delta x_{10}$. The amount of change in the optical output in this state is expressed by $\Delta f$ and the inclination during this movement is given as $\Delta f/\Delta x_1$ (Step 118). Then, a movement $\Delta x_2$ is effected in the direction $x_2$, followed by consecutive movements $\Delta x_3$, $\Delta x_4, \ldots, \Delta x_n$, with calculation of the inclinations 120–128. The probing is continued in the manner described and is ceased when a predetermined value $f_c$ is reached or when a predetermined number of probing cycles is reached.

A second embodiment of the invention will be described hereinunder.

The principle of the second embodiment is as follows. The displacements $x_1, x_2, \ldots, x_n$ of n-th order is given as follows.

$$\overline{S} = (x_1, x_2, \ldots, x_n) \tag{16}$$

In this case, the estimation function f is expressed as follows.

$$f = f(\overline{S}) \tag{17}$$

Since the value of $f(\overline{S})$ is obtained as the optical output at every moment, it is not necessary to provide a practical form of $f(\overline{S})$.

The value of the estimation function as obtained when the condition of $\overline{S} = \overline{S}_m$ is met is expressed as $f_m = f(\overline{S}_m)$. The gradient $\overline{e}_m$ of the estimation function is given by the following formula.

$$\begin{aligned} \overline{e}_m &= \nabla f_m \\ &= \frac{\partial f_m}{\partial x_1}\overline{x}_1 + \frac{\partial f_m}{\partial x_2}\overline{x}_2 + \ldots + \frac{\partial f_m}{\partial x_n}\overline{x}_n \end{aligned} \tag{18}$$

where, $\overline{x}_1, \overline{x}_2, \ldots, \overline{x}_n$ are unit vectors of each moving direction of the fine motion mechanism. When the amounts of movement are small, these amounts are expressed as $\Delta\overline{x}_1, \Delta\overline{x}_2, \ldots, \Delta\overline{x}_n$. In this case, the gradient $\overline{e}_m$ is given by the following formula.

$$\overline{e}_m = \frac{\Delta f_m}{\Delta x_1}\overline{x}_1 + \frac{\Delta f_m}{\Delta x_2}\overline{x}_2 + \ldots + \frac{\Delta f_m}{\Delta x_n}\overline{x}_n \tag{19}$$

where, $\Delta f_m$ is the amount of change in the value of the estimation function, which is given by the following formula (20).

$$\Delta f_m = f_m - f_{m-1} = f(\overline{S}_m) - f(\overline{S}_{m-1}) \tag{20}$$

As will be seen from formula (20), the gradient $\overline{e}_m$ varies largely depending on the value of the estimation function, such that it takes a large value in the region where the estimation function has a large value and a small value in the region where the estimation function takes a small value. Thus, the gradient $\overline{e}_m$ is largely varied by the absolute value. In order to avoid this problem, the amount of change in the value of the estimation function is normalized as follows by the value $f_{m-1}$ of the estimation function as obtained before the movement.

$$\overline{e}_m^* = \frac{\Delta f_m^*}{\Delta x_1}\overline{x}_1 + \frac{\Delta f_m^*}{\Delta x_2}\overline{x}_2 + \ldots + \frac{\Delta f_m^*}{\Delta x_n}\overline{x}_n \tag{21}$$

where, $$\begin{aligned} \Delta f_m^* &= \frac{f_m - f_{m-1}}{f_{m-1}} \\ &= \frac{\Delta f_m}{f_{m-1}} \end{aligned} \tag{22}$$

Using the value of gradient $\bar{e}_m^*$ of the estimation function thus obtained, the amount $\delta x_1, \delta x_2, \ldots, \delta x_n$ of movement effected by the fine motion mechanism are determined in such a manner as to make the estimation function approach the maximum value from the instant position, i.e., in the direction of $\bar{e}_m^*$.

$$d_{xi} = G \frac{\Delta f_m^*}{\Delta x_i} \quad (i = 1, 2, \ldots, n) \tag{23}$$

where, $$G = A \left( \sqrt{\bar{e}_m^* \cdot \bar{e}_m^*} \right)^p$$

wherein A and p are constants ($A > 0$, $p \geq 0$).

The fine motion mechanism progressively moves towards the direction of the gradient so that the estimation function value reaches the maximum value. The gradient becomes zero when the maximum value is reached. In this state, the mechanism does not work any more, so that the aligning operation is finished.

In this embodiment, the amount of movement to be achieved by the fine motion mechanism is determined on the basis of the gradient which in turn is obtained by normalizing the amount of change in the evaluation function. According to this arrangement, the mechanism is driven in accordance with the rate of change of the estimation function value rather than the absolute value of the estimation function. In consequence, the large amount of movement given by the fine motion mechanism is large when the mechanism is remote from the position corresponding to the maximum value but is small when the position corresponding to the maximum value has been approached, whereby an efficient probing is obtained.

Figure 7:
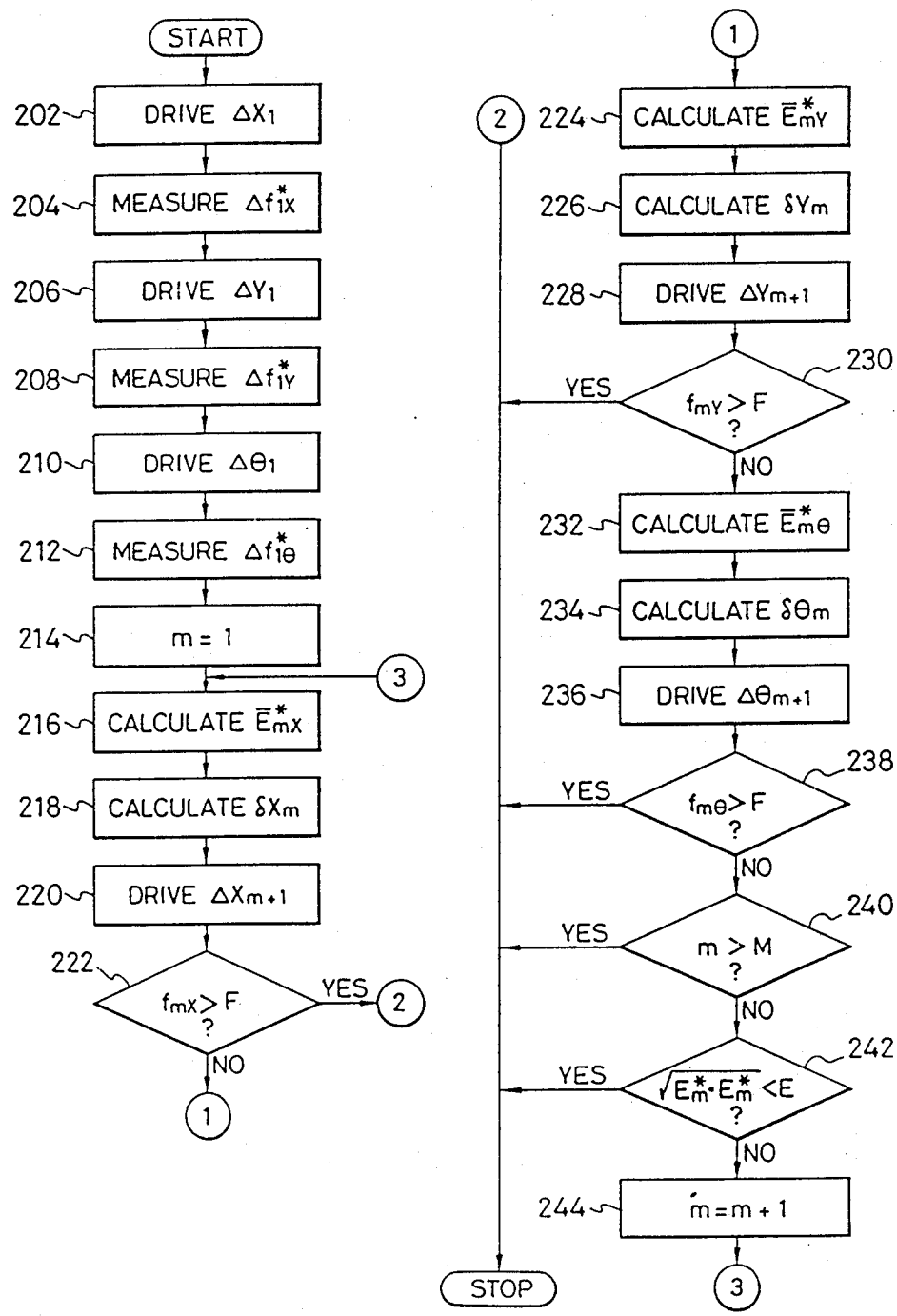
FIG. 7 is a flow chart illustrating the control procedure in accordance with a second embodiment.

A practical process in accordance with the second embodiment will be explained with reference to FIG. 7.

The displacements of the mechanism when it has just gripped the supporting post 5 by the gripper are given by $X_0$, $Y_0$ and $\theta_0$, while the optical output in this state is represented by $f_0$. In the first cycle, the X-direction actuator is driven (Step 202) in the X direction by an amount corresponding to the amount $\Delta X_1$ which is set beforehand, and the optical output in this state is measured to obtain the following condition (Step 204).

$$\Delta f_{1x}^* = \frac{f_{1X} - f_0}{f_0} \tag{24}$$

Thereafter, operations for driving by previously set amounts $\Delta Y_1$ and $\Delta \theta_1$ are conducted both in Y and $\theta$ directions, so that the following conditions are derived from respective optical outputs $f_{1Y}$ and $f_{10\theta}$ (Steps 206–212).

$$\Delta f_{1Y}^* = \frac{f_{1Y} - f_{1X}}{f_{1X}} \tag{25}$$

$$\Delta f_{1\theta}^* = \frac{f_{1\theta} - f_{1Y}}{f_{1Y}} \tag{26}$$

Then, the following operations are conducted (Steps 214–244) on the basis of the data shown in formulae (24) to (26).

In the steps 216, 224 and 232, the following averaging operation is carried out to minimize the noise content in the value of the estimation function.

$$\bar{E}_m^* = \alpha_0 \bar{e}_m^* + \alpha_1 \bar{e}_{m-1}^* + \ldots + \alpha_l \bar{e}_{m-l}^* \tag{27}$$

where $$\alpha_0 + \alpha_1 + \ldots + \alpha_l = 1$$

$$\alpha_0, \alpha_1, \ldots, \alpha_l \geq 0$$

In formula (27) $\bar{e}_m^* 1, \ldots, \bar{e}_{m-l}^*$ represent, respectively, the gradients in the cycles which are 1 to l th preceding cycles as counted from the instant position, and are given by the formula (21). Symbols $\alpha_0$ to $\alpha_l$ represent the weight coefficients.

The gradient $\bar{e}m^*X$ of the optical output $f_mX$ in the $3m+1$ th cycle ($m=1, 2, \ldots$) are determined (Step 216) as follows in accordance with the formulae (21) and (27).

$$\bar{e}_{mX}^* = \frac{\Delta f_{mX}^*}{\Delta X_m} \bar{X} + \frac{\Delta f_{mY}^*}{\Delta Y_m} \bar{Y} + \frac{\Delta f_{m\theta}^*}{\Delta \theta_m} \bar{\theta} \tag{28}$$

$$\bar{E}_{mX}^* = \alpha_0 \bar{e}_{mX}^* + \alpha_1 \bar{e}_{m-1,X}^* + \ldots + \alpha_l \bar{e}_{m-l,X}^* \tag{29}$$

Referring to formula (28), the terms $\Delta f_m^*X$, $\Delta f_m^*Y$ and $\Delta f_m^*\theta$ in the right side of this formula should be replaced, in a strict sense, with the values which are obtained by normalizing the amount of change in the optical outputs obtained when the fine motion mechanism is driven simultaneously in all directions X, Y and $\theta$ by amounts $\Delta X_m$, $\Delta Y_m$ and $\Delta \theta_m$. Practically, however, the normalized values can be regarded as being materially the same as the values $\Delta f_m^*X$ $\Delta f_m^*Y$ and $\Delta f_m^*\theta$, so that formula (28) is valid.

Referring now to Formula (29), if the condition of m is met, the following condition is established.

$$\bar{e}_{m-1}^*, X = \bar{e}_{m-2}^*, X = \ldots \ldots = \bar{e}_{m-l}^*, X \tag{30}''$$

and substitute therefor—Regarding formula (29), during the initial stages of the probing control operation wherein a condition $1 \leq m \leq l$ is met, the values of the gradient in the preceding cycles which are necessary for calculating $\bar{E}_m^*X$ in accordance with formula (29) are those in only 1 to m-th cycles. In the initial stages wherein the condition $1 \leq m \leq l$ is met, the following condition is established for calculating $\bar{E}_m^*X$ in accordance with formula (29):

$$\bar{e}_{1,X}^* = \bar{e}_{0,X}^* = \bar{e}_{m-(m+1),X}^* = \ldots = \bar{e}_{m-l,X}^* \tag{30}$$

The amount $\delta X_m$ in the X direction is determined in accordance with formula (20) on the basis of the formula (23).

$$\delta X_m = G \frac{\Delta \bar{f}_{mX}}{\Delta X_m} \tag{31}$$

where, $$G = A \left( \sqrt{\bar{E}_{mX}^* \cdot \bar{E}_{mX}^*} \right)^p \tag{32}$$

The values of coefficients $\alpha_0$ to $\alpha_l$, l, A and p appearing in formulae (29) and (32) are optimally determined through experiments.

Subsequently, the fine motion mechanism is moved in the X direction by amount $\delta X_m$ (Step 220) and the (3m+2) th optical output fmY is measured. The gradient $\vec{E}_{mY}^*$ also is determined (Step 224) as follows.

$$\vec{e}_{mY}^* = \frac{\Delta f_{m+1,X}^*}{\Delta X_{m+1}} \bar{X} + \frac{\Delta f_{mY}^*}{\Delta Y_m} \bar{Y} + \frac{\Delta f_{m\theta}^*}{\Delta \theta_m} \bar{\theta} \quad (33)$$

$$\vec{E}_{mY}^* = a_0 \vec{e}_{mY}^* + a_1 \vec{e}_{m-1,Y}^* + \ldots + a_l \vec{e}_{m-l,Y}^* \quad (34)$$

Similarly, the amount δYm of movement in the Y direction is determined (Step 226) by the following formulae.

$$\delta Y_m = G \frac{\Delta \vec{f}_{mY}}{\Delta Y_m} \quad (35)$$

$$G = A \left( \sqrt{\vec{E}_{mY}^* \cdot \vec{E}_{mY}^*} \right)^P \quad (36)$$

Then, the fine motion mechanism is actuated (Step 228) by amount $\delta Y_m$ in the Y direction and the optical output fmθ for (3m+3) th cycle is measured.

The gradient $\vec{E}_{m\theta}^*$ and the amount δθm of movement in the θ direction are determined in accordance with the following formulae.

$$\vec{e}_{m\theta}^* = \frac{\Delta f_{m+1,X}^*}{\Delta X_{m+1}} \bar{X} + \frac{\Delta f_{m+1,Y}^*}{\Delta Y_{m+1}} \bar{Y} + \frac{\Delta f_{m\theta}^*}{\Delta \theta_m} \bar{\theta} \quad (37)$$

$$\vec{E}_{m\theta}^* = a_0 \vec{E}_{m\theta}^* + a_1 \vec{E}_{m-1,\theta}^* + \ldots + a_l \vec{E}_{m-l,\theta}^* \quad (38)$$

$$\delta \theta_m = G \frac{\Delta \vec{f}_{m\theta}}{\Delta \theta_m} \quad (39)$$

$$G = A \left( \sqrt{\vec{E}_{m\theta}^* \cdot \vec{E}_{m\theta}^*} \right)^P \quad (40)$$

$$\Delta Y_{m+1} = \delta Y_m$$

Then, $\Delta \theta_{m+1}$ is set as $\delta \theta_m$ and 1 is added to m so that the process returns to the initial state and then repeated.

This repetitional operation is continued and is stopped when the optical output f has been increased to exceed a predetermined value F (Steps 222, 230, 238), or when the gradient is decreased to reduce the value $\sqrt{Em^* \cdot Em^*}$ down below a predetermined value E (Step 242) or when the number m of the probing cycles has been increased to exceed a predetermined number M (Step 204), whereby the optical axis alignment is accomplished.

As has been described, in the embodiment of the invention, not only the movement towards the maximum value but also the determination of the gradient of the estimation function value is conducted in each step during the probing, so that it becomes unnecessary to determine the gradients in all directions, thus providing advantages such as higher efficiency of probing, shortening of the probing time, and reduction in the load on the mechanism.

In addition, since the gradient is determined through normalization of the estimation function, the gradient of the estimation function is estimated without being affected by the absolute value of the estimation function, the requirement for a change in the parameter can be reduced even for devices which involve fluctuation of the output.

In addition, since the gradient is determined taking into account also the gradients in the past, it is possible to absorb any abrupt apparent change in the gradient due to noise, so that the probing can be conducted smoothly even though the control is conducted in accordance with differentiated values.

What is claimed is:

1. A probing method for effecting optical access alignment of an optical fiber in a laser diode with optical fiber, said method employing a mechanism with a plurality of degrees of freedom, said method comprising the steps of:

driving by predetermined amounts in one-by-one fashion a plurality of actuators for driving said mechanism;

determining change in an optical output from an object in response to the driving of each of the actuators and obtaining a gradient in the optical output on the basis of the change determined;

obtaining an amount of movement for driving each of said actuators on the basis of the gradient in the optical output in an immediately preceding step of driving the same actuator, driving the same actuator by the amount of movement thus obtained, and sequentially measuring the optical output in response to the driving of each actuator; and determining whether conditions have occurred of said optical output exceeding a first predetermined value or said gradient in the optical output falling below a second predetermined value, stopping the driving of the actuators when one of said conditions has occurred, and repeating the step of driving the actuators in one-by-one fashion when none of said conditions have occurred.

2. A probing method for effecting optical access alignment of an optical fiber in a laser diode with optical fiber, said method employing a mechanism with multiple degrees of freedom, said method comprising the steps of:

driving in one-by-one fashion three actuators for driving a mechanism having three degrees of freedom in horizontal, vertical and rotating directions by predetermined amounts in the horizontal, vertical and rotating directions, respectively;

measuring an optical output from an object and obtaining changes in the optical output in the respective horizontal, vertical and rotating directions in response to the driving of each actuator;

obtaining a gradient in the optical output on the basis of the changes in the optical output in the respective directions;

determining subsequent amounts of movement of the actuators in the horizontal, vertical and rotating direction, respectively, from present positions of the actuators, on the basis of the gradient in such a manner that the gradient takes a minimum value, and driving each actuator to effect the subsequent amounts of movement;

measuring the optical output and obtaining the gradient therein in response to the driving of each actuator; and deciding whether conditions have occurred of said optical output exceeding a first predetermined value, said gradient in the optical output falling below a second predetermined value or a number of times for driving the actuators exceeding a predetermined number;

stopping the driving of said three actuators when any one of the conditions has occurred; and repeating the steps of obtaining a gradient, determining amounts of movement and measuring the optical output to determine sequentially the amounts of movement of said actuators and driving each actuator when any of the conditions have not occurred.

3. A probing control apparatus, comprising:

a multiple degree of freedom mechanism having n-degrees of freedom for controlling alignment of an object providing an output having an outer frame coupled via a first parallel leaf spring mechanism with an intermediate frame, said intermediate frame being coupled via a second parallel leaf spring mechanism with an inner frame and said inner frame being coupled via a third spring mechanism with an end frame;

n actuators for actuating said mechanism;

means for detecting changes in the output from said object in response to the operation of each of said actuators; and control means for computing a command for each of said actuators in accordance with a change in the output detected by said detecting means and an amount of movement of said mechanism, and for controlling each actuator in accordance with said command such that said output from said object takes a maximum value.

4. A probing control apparatus, comprising:

adjustment means having a plurality of frames including one frame exhibiting a central point and a plurality of mechanisms interconnecting said frames to provide multiple degrees of freedom of movement of said adjusting means about said central point, said one frame engaging an optical element effecting an output signal, for controlling deflection of an optical axis of said optical element;

a plurality of actuators for moving said frames relative to each other during discreet adjustment operations in response to commands specifying amounts of movement;

means for detecting the output signal of said optical element; and control means for computing subsequent commands in accordance with the amounts of movement specified by preceding corresponding ones of said commands and changes in the output signal detected by said detecting means occurring as a result of movement of said frames in response to respective said preceding corresponding ones of said commands during said adjustment operations, and for controlling said actuators in accordance with said subsequent commands to cause said output to attain a maximum value.

5. A probing control apparatus according to claim 4, wherein said adjustment means comprises an outer frame coupled via a first parallel leaf spring mechanism with an intermediate frame, said intermediate frame being coupled via a second parallel leaf spring mechanism with an inner frame and said inner frame being coupled via a third spring mechanism with an end frame exhibiting the central point.

6. A probing control apparatus according to claim 5, wherein said actuators are disposed for individually causing said outer frame to move relative to said intermediate frame, said intermediate frame to move relative to said inner frame, and said inner frame to move relative to said end frame.

7. A probing control apparatus according to claim 4, wherein said control means normalizes change in the output signal detected by said detecting means and computes said subsequent commands on the basis of a normalized change and the amount of movement for one of said actuators contained in a preceding corresponding one of said adjustment operations.

8. A probing control apparatus, comprising:

adjustment means having a plurality of frames including one frame exhibiting a central point and a plurality of mechanism interconnecting said frames to provide multiple degrees of freedom of movement of said adjusting means about said central point, said one frame engaging an optical element effecting an output signal, for controlling deflection of an optical axis of said optical element;

a plurality of actuators disposed to displace said frames relative to the component coordinates of a coordinate system during cycles of adjustment operations in response to commands specifying amounts of movement of said frames by respective ones of said actuators;

means for detecting the output signal of said optical element;

control means for determining changes in the output signal associated with each of said component coordinates for each cycle of said adjustment operations, for determining values of gradients in the output signal relative to amounts of movement for respective ones of said component coordinates contained in preceding commands, for performing averaging routines on corresponding values of the gradients relative to each of said component coordinates, for computing said commands to maximize the values of the output associated with each of said component values by discretely driving said actuators, and for driving said actuators on the basis of said commands.

9. A probing control apparatus according to claim 8, wherein said adjustment means comprises an outer frame coupled by a first parallel leaf spring mechanism with an intermediate frame, said intermediate frame being coupled by a second parallel leaf spring mechanism with an inner frame and said inner frame being coupled by a third spring mechanism with an end frame exhibiting the central point.

10. A probing control apparatus according to claim 9, wherein said actuators are disposed for individually causing said outer frame to move relative to said intermediate frame, said intermediate frame to move relative to said inner frame, and said inner frame to move relative to said end frame.

11. A probing control apparatus according to claim 8, wherein said control means is adapted to normalize change in the output signal detected by said detecting means and to compute said gradients on the basis of a normalized change and the amount of movement for one of said actuators contained in a preceding corresponding one of said adjustment operations.

* * * * *